Aug. 12, 1941.   J. CAMPBELL   2,252,553
SAFETY GRIP ELECTRIC PLUG
Filed Jan. 17, 1940
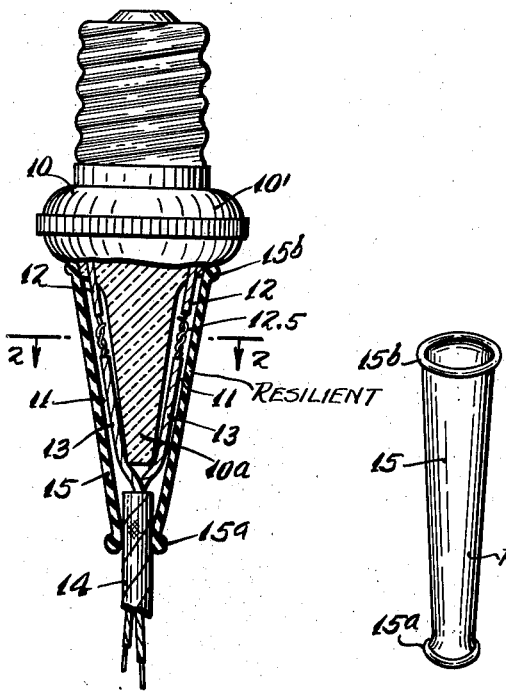
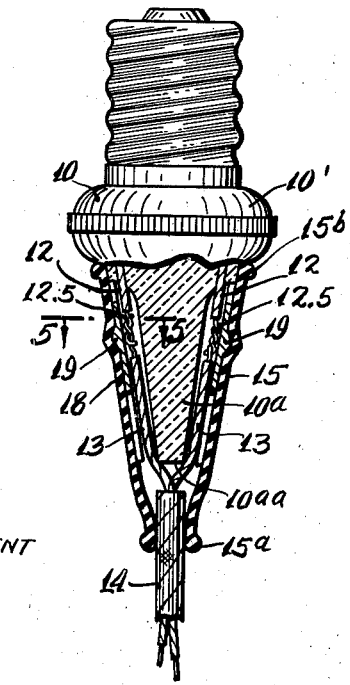
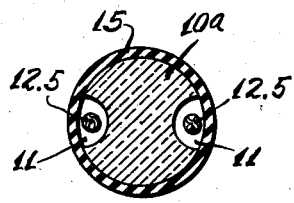
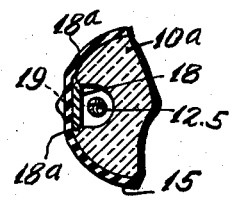
INVENTOR
Joseph Campbell
BY
ATTORNEY Patented Aug. 12, 1941

2,252,553

UNITED STATES PATENT OFFICE 2,252,553

SAFETY GRIP ELECTRIC PLUG

Joseph Campbell, Bergenfield, N. J.

Application January 17, 1940, Serial No. 314,201

3 Claims. (Cl. 173—361)

This invention relates to new and useful improvements in a safety grip electric plug.

The invention has for an object the construction of a safety grip electric plug which is characterized by an electric plug having a body with a conically shaped outer end provided with grooves along its outer sides, and the electric wires from the poles of electric plug extending into said grooves and adapted to be spliced with outside wires, and a novel arrangement for encasing the said outer end of said body for covering the spliced wires.

Specifically, the invention contemplates the use of a flexible elastic tubular cover engaged over the conically shaped end of the plug body for covering the grooves and the spliced ends of the wires reposed in said grooves.

Still further the invention proposes characterizing said flexible elastic tubular cover by the fact that it is formed from rubber material which may be rolled into annular form and so slipped on the small end of the conical end of the plug body and unrolled into position thereon.

Still further the invention proposes a novel arrangement of slide members mounted upon the plug body over the grooves and arranged to encase the splices previously mentioned and adapted to be held in stationary positions by engagement with the flexible elastic tubular cover so that the spliced wires are restrained from possibly damaging the tubular cover.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure—

Fig. 1 is a side elevational view of a safety grip electric plug with a portion thereof broken away to disclose interior parts, and constructed according to this invention.

Fig. 2 is a horizontal sectional view as though taken on the line 2—2 of the plug shown in Fig. 1.

Fig. 3 is a perspective view of the elastic tubular cover of the safety plug illustrated per se.

Fig. 4 is a side elevational view with a portion broken away similar to the showing in Fig. 1, but illustrating a modified form of plug.

Fig. 5 is a fragmentary horizontal sectional view taken on the line 5—5 of Fig. 4.

The safety grip electric plug, according to this invention, includes an electric plug 10 having a body 10' with a conically shaped outer end 10ᵃ which is provided with grooves 11 along its sides. Electric wires 12 from the poles of the electric plug extend into the grooves 11 and are adapted to be spliced with outside wires 13 of a cable 14. A flexible elastic tubular cover 15 is engaged over the conical shaped end portion 10ᵃ of the plug body and covers the grooves 11.

The tubular cover 15 preferably is made from sheet rubber material. It is provided with end portions 15ᵃ and 15ᵇ which are beaded to reinforce the end portions thereof and to provide foundation material upon which the intermediate portions of the rubber cover may be rolled. Thus the cover 15 may be rolled up into an annular formation. The spliced ends of the electric wires 12 and 13 are indicated by the reference numerals 12.5.

The operation of the device is as follows:

The tubular cover 15 is rolled into annular formation and is engaged upon the end of the cable 14. Then the ends of the wires 13 of the cable are connected with the ends of the wires 12 by the spliced connection indicated by the reference numerals 12.5. The tubular cover 15 is then unrolled until it assumes a position as illustrated in Fig. 1 of the drawing. The electric plug may now be gripped at the tubular cover portion 15 to engage and remove it from an electric socket.

In Figs. 4 and 5 a modified form of the invention has been disclosed which distinguishes from the prior form essentially in the fact that small rigid slides 18 are slidably mounted on the plug body 10ᵃ over the grooves 11 and are adapted to encase the spliced connections 12.5. More specifically, the sides of the slides 18 are formed with double beveled edges 18ᵃ which engage into complementary grooves or tracks extended upwards from the bottom end 10ᵃᵃ of the end portion 10ᵃ of the plug body. Each of the slides 18 has a projection 19 on its outer face which normally is engaged and held frictionally by the material of the elastic tubular cover 15.

The operation of this device is substantially identical to the prior form, differing only in the fact that after the splices 12.5 have been completed the slides 18 are shifted in position over the splices, after which the tubular cover 15 is unrolled into position over the slides 18. The parts are then in the positions illustrated in Fig. 4. The slides 18 serve to protect the material of the cover 15 immediately adjacent the splices 12.5, eliminating any possible piercing or other damage to the cover 15 at these areas.

While I have illustrated and described the preferrd embodiments of my invention, it is to be understood that I do not limit myself to the precise constructions herein disclosed and the right is reserved to all changes and modifications coming within the scope of the invention as defined in the appended claims.

Having thus described my invention, what I claim as new and desire to secure by United States Letters Patent is:

1. In a safety grip electric plug, an insulation body formed with a groove extending longitudinally along one side thereof, an electric wire extending along and within said groove, a slide extending between the walls of said insulation body forming said groove for protecting said wire where it extends within said groove and means for releasably holding said slide in position along the open side of said groove.

2. In a safety grip electric plug, an insulation body formed with a groove extending longitudinally along one side thereof, an electric wire extending along and within said groove, a slide extending between the walls of said insulation body forming said groove for protecting said wire where it extends within said groove, means for slidably supporting said slide along the open side of said groove to be movable longitudinally of said body, comprising double beveled edges formed on the sides of said slide forming tracks, said tracks being slidably engageable with complementary grooves formed in the material of said insulation body on opposite sides of said groove, and means for frictionally holding said slide from moving longitudinally of said body.

3. In a safety grip electric plug, an insulation body formed with a groove extending longitudinally along one side thereof, an electric wire extending along and within said groove, a slide extending between the walls of said insulation body forming said groove for protecting said wire where it extends within said groove, means for slidably supporting said slide along the open side of said groove to be movable longitudinally of said body, comprising double beveled edges formed on the sides of said slide forming tracks, said tracks being slidably engageable with complementary grooves formed in the material of said insulation body on opposite sides of said groove, and means for frictionally holding said slide from moving longitudinally of said body, comprising a tubular flexible elastic cover engaged upon said insulation body and having a portion of its inside face frictionally engaging the exposed outer face of said slide.

JOSEPH CAMPBELL.